United States Patent
Nakata

(10) Patent No.: US 7,734,964 B2
(45) Date of Patent: Jun. 8, 2010

(54) OPTICAL DISC RECORDING/REPRODUCING APPARATUS

(75) Inventor: Eiji Nakata, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 738 days.

(21) Appl. No.: 11/518,982

(22) Filed: Sep. 12, 2006

(65) Prior Publication Data

US 2007/0061636 A1 Mar. 15, 2007

(30) Foreign Application Priority Data

Sep. 13, 2005 (JP) .............................. 2005-265407

(51) Int. Cl.
*G11C 29/00* (2006.01)
*G11B 5/58* (2006.01)
(52) U.S. Cl. ..................... 714/710; 369/53.17
(58) Field of Classification Search .............. 714/710, 714/718, 723; 369/47.22, 53.15, 53.17, 53.35
See application file for complete search history.

(56) References Cited

U.S. PATENT DOCUMENTS

| | | | | |
|---|---|---|---|---|
| 6,978,404 | B2 * | 12/2005 | Ueda et al. ................ | 714/710 |
| 7,123,556 | B2 * | 10/2006 | Ueda et al. ................ | 369/47.14 |
| 7,184,377 | B2 * | 2/2007 | Ito et al. ................... | 369/47.14 |
| 7,257,074 | B2 * | 8/2007 | Yoshida et al. .......... | 369/275.3 |
| 7,260,034 | B2 * | 8/2007 | Yoshida et al. .......... | 369/47.14 |
| 7,337,354 | B2 * | 2/2008 | Yoshida et al. ................. | 714/8 |
| 7,345,968 | B2 * | 3/2008 | Yoshida et al. .......... | 369/47.14 |
| 7,359,261 | B1 * | 4/2008 | Wu et al. .................... | 365/200 |
| 7,385,890 | B2 * | 6/2008 | Yoshida et al. .......... | 369/47.14 |
| 7,460,450 | B2 * | 12/2008 | Yoshida et al. .......... | 369/47.14 |
| 2004/0120233 | A1 * | 6/2004 | Park et al. ................ | 369/47.13 |
| 2004/0218487 | A1 * | 11/2004 | Youn ........................ | 369/44.32 |
| 2004/0228245 | A1 * | 11/2004 | Lee et al. ................. | 369/53.21 |
| 2005/0007920 | A1 * | 1/2005 | Kim et al. ................ | 369/47.41 |
| 2005/0195710 | A1 * | 9/2005 | Koda et al. .............. | 369/47.14 |
| 2005/0201213 | A1 * | 9/2005 | Sasaki ...................... | 369/30.08 |

(Continued)

FOREIGN PATENT DOCUMENTS

JP A-08-087829 4/1996

(Continued)

*Primary Examiner*—Cynthia Britt
(74) *Attorney, Agent, or Firm*—Morgan Lewis & Bockius LLP

(57) ABSTRACT

Provided is an optical disc recording/reproducing apparatus that performs recording and reproducing. The optical disc recording/reproducing apparatus has a recording control portion for storing, when recording data on the optical disc, an error address and an error code in a nonvolatile memory when a recording error occurs and, after recording is stopped, writing the error address and the error code read from the nonvolatile memory to a predetermined area of the optical disc, and a reproduction control portion for reading, when reproducing the data from the optical disc which is recorded according to the control of the recording control portion, the error address and the error code from the predetermined area and then storing the read error address and error code in the nonvolatile memory and, if an address of a recording error is found after reading of the data of the optical disc has started, reading the error address and the error code from the nonvolatile memory and then transferring the read error address and error code to a back-end processing portion to prevent data from being read from the address of the recording error.

7 Claims, 5 Drawing Sheets

U.S. PATENT DOCUMENTS

| | | | |
|---|---|---|---|
| 2005/0210319 A1* | 9/2005 | Kim et al. | 714/8 |
| 2005/0281164 A1* | 12/2005 | Yoshida et al. | 369/53.17 |
| 2006/0018220 A1* | 1/2006 | Lee et al. | 369/47.1 |
| 2006/0171271 A1* | 8/2006 | Park | 369/47.13 |
| 2006/0239161 A1* | 10/2006 | Takahashi et al. | 369/53.24 |

FOREIGN PATENT DOCUMENTS

| | | |
|---|---|---|
| JP | A-2000-076785 | 3/2000 |
| JP | A-2002-329321 | 11/2002 |
| WO | WO 2005066943 A1 * | 7/2005 |

* cited by examiner

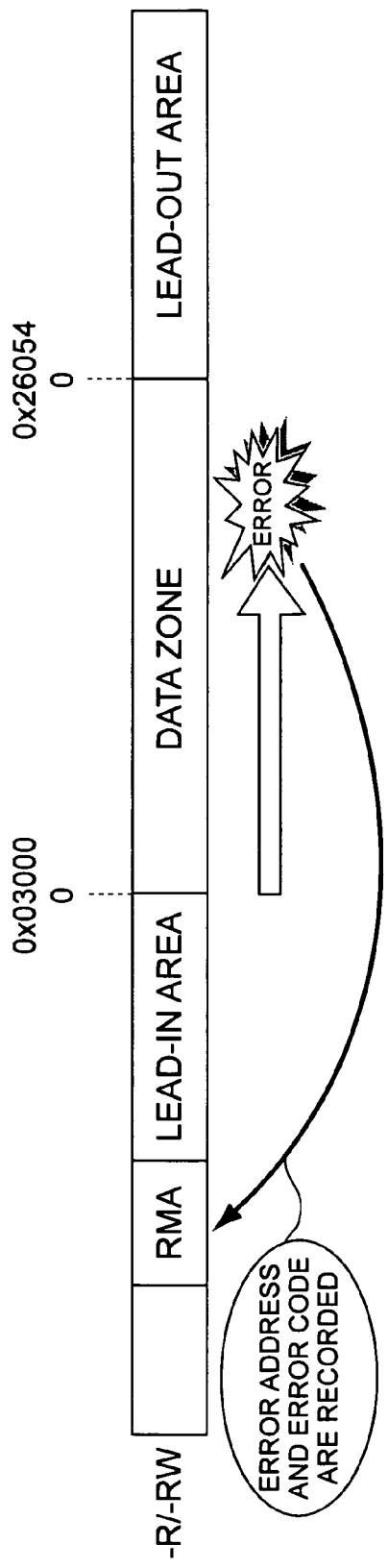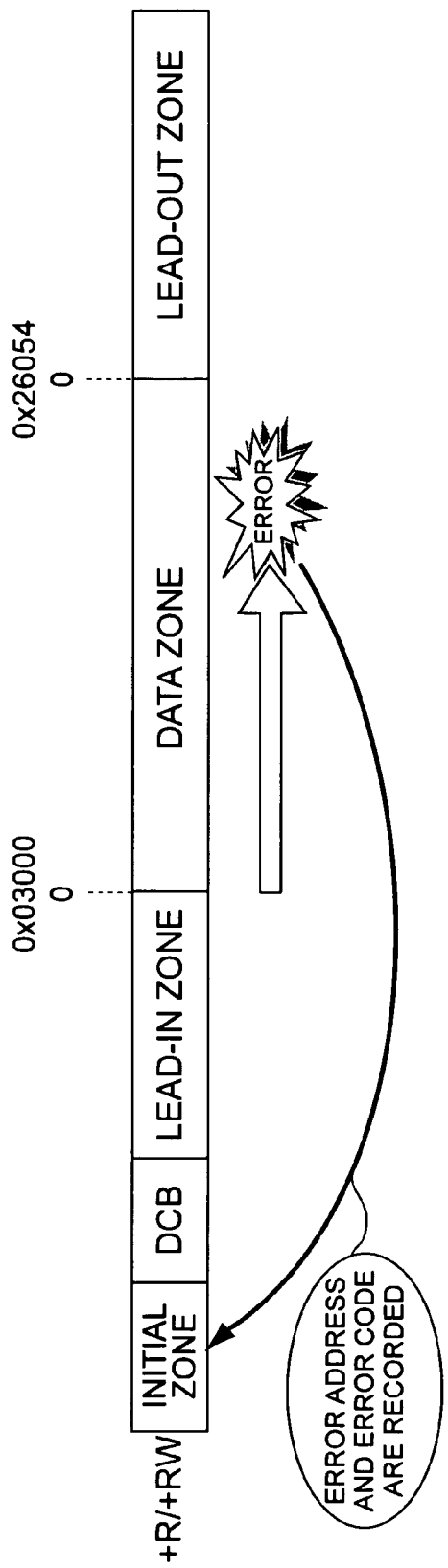

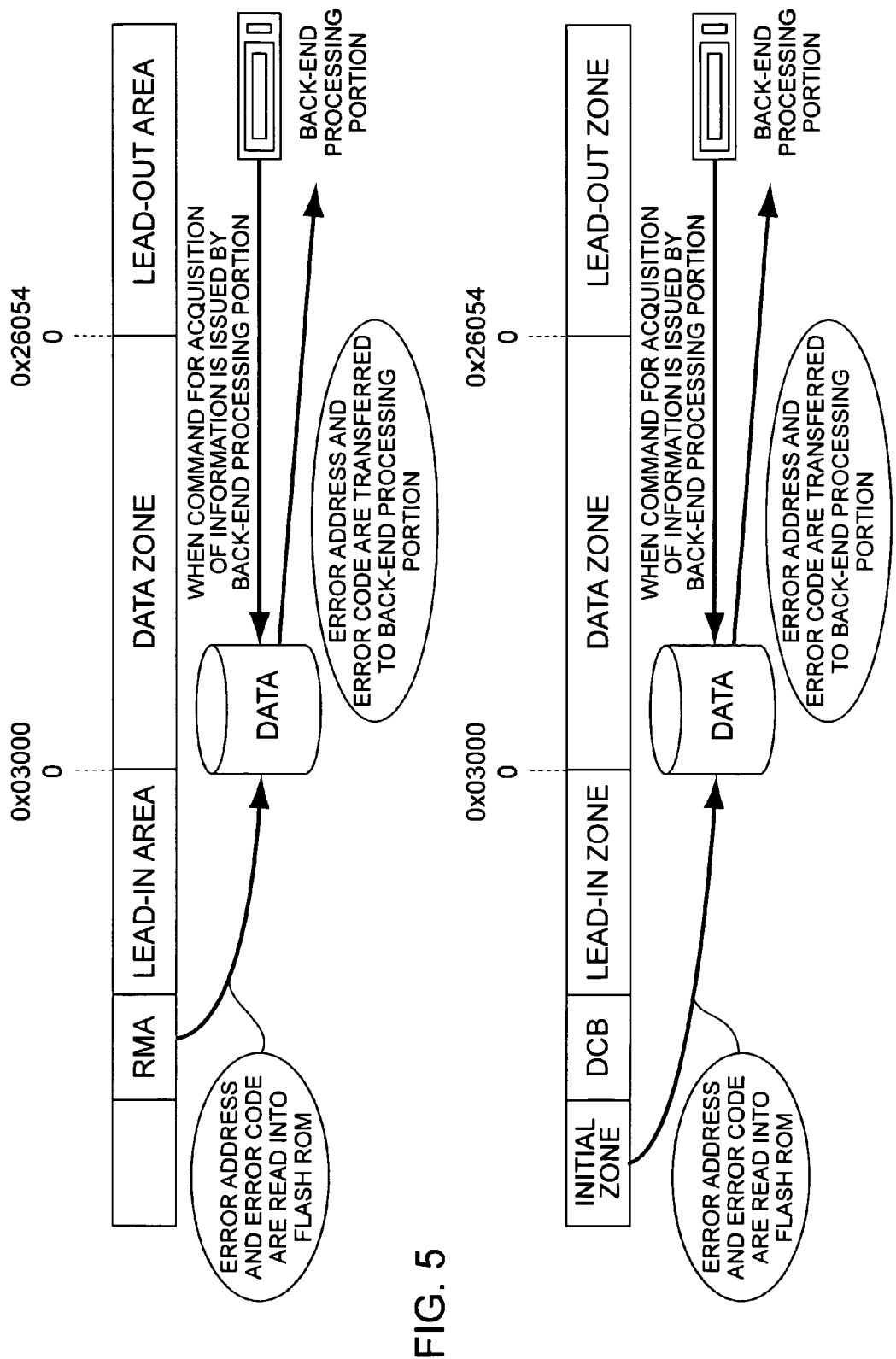

OPTICAL DISC RECORDING/REPRODUCING APPARATUS

This application is based on Japanese Patent Application No. 2005-265407 filed on Sep. 13, 2005, the contents of which are hereby incorporated by reference.

BACKGROUND OF THE INVENTION

1. Field of the Invention

The present invention relates to an optical disc recording/reproducing apparatus that records and reproduces data on and from an optical disc. More particularly, the present invention relates to a process of recording data on a minus format DVD such as a DVD-R or a DVD-RW or a plus format DVD such as a DVD+R or a DVD+RW, and a process of reproducing data from the minus format DVD such as a DVD-R or a DVD-RW or the plus format DVD such as a DVD+R or a DVD+RW.

2. Description of Related Art

In recent years, DVDs (digital versatile discs), which are optical discs that can record information such as a large amount of video/audio data like that of movies, have been increasingly widespread. As these DVDs, various types are known such as a DVD-ROM containing information that is pre-recorded by a manufacturer and cannot be rewritten by a user, a DVD-R or a DVD+R that allows the user to record information thereon only once, and a DVD-RW, a DVD+RW, or a DVD-RAM that allows the user to rewrite information thereon repeatedly. Information recorded on these DVDs can be reproduced by DVD players (optical disc reproducing apparatuses) or DVD recorders (optical disc recording/reproducing apparatuses), and information can be recorded on a DVD+R, a DVD+R, a DVD-RW, a DVD+RW, and a DVD-RAM by using DVD recorders. In the following description, a DVD such as a DVD-R or a DVD-RW will be referred to as a "minus format DVD" and a DVD such as a DVD+R or a DVD+RW will be referred to as a "plus format DVD".

In conventional optical disc recording/reproducing apparatuses, if a recording error occurs while data is being recorded on a minus format DVD or a plus format DVD, a write retry is performed a predetermined number of times on an address at which a write of data has unsuccessfully been done. In a case where write retries performed the predetermined number of times end up in failure, the address is skipped over to record data on the next address. On the other hand, at the time of reproduction, a read retry is performed a predetermined number of times on the address at which the recording error has occurred. In a case where read retries performed the predetermined number of times end up in failure, the address is skipped over and data is read from the next address.

For example, JP-A-2000-076785 discloses a conventional recording/reproducing method by which, if a defective block is found while data is being recorded on or reproduced from a DVD, the found defective block is ignored to continue recording/reproducing of data. Alternatively, a defective block registered in an SDL (secondary defect list) is skipped over, and, in the case of a new defective block that is not registered in the SDL, location information thereof is registered in the SDL entry after recording/reproducing of data is completed.

Now, as described above, in the conventional optical disc recording/reproducing apparatuses, if a recording error occurs after a write of data is started to record data on a minus format DVD or a plus format DVD, a write retry is performed a predetermined number of times on an address at which a write of data has unsuccessfully been done. In a case where write retries performed the predetermined number of times end up in failure, the address is skipped over to record data on the next address. On the other hand, at the time of reproduction, a read retry is performed a predetermined number of times on the address at which the recording error has occurred. In a case where read retries performed the predetermined number of times end up in failure, the address is skipped over and data is read from the next address. This disadvantageously causes time loss in recording/reproducing.

Incidentally, the conventional technique disclosed in JP-A-2000-076785 relates to recording and reproducing data on and from a DVD-RAM. This makes it impossible to apply this technique to a minus format DVD or a plus format DVD due to a difference in the data structure of the disc.

On the other hand, an apparatus disclosed in JP-A-2002-329321 records a track number of a CD in a PMA (program memory area) as a skip ID if recording is not performed properly, and, at the time of reproduction, the track corresponding to the skip ID is skipped over. This makes it impossible to apply this technique to a minus format DVD or a plus format DVD due to a difference in the data structure of the disc.

Furthermore, JP-A-08-087829 discloses a data managing method for an optical disc, by which an error block is skipped over at the time of data reading by referring to a write error block management file provided in a control unit. However, it is not clear what is referred to here as the optical disc is a minus format DVD or a plus format DVD, and a specific recording/reproducing process for such a DVD is not disclosed therein.

In view of the conventionally experienced problems described above, it is an object of the present invention to provide an optical disc recording/reproducing apparatus that prohibits reading from an address at which a recording error has occurred at the time of recording data on a minus format DVD such as a DVD-R or a DVD-RW, or a plus format DVD such as a DVD+R or a DVD+RW.

SUMMARY OF THE INVENTION

To achieve the above object, an optical disc recording/reproducing apparatus that records and reproduces data on and from an optical disc is provided with: a recording control portion for storing, when recording data on the optical disc, an error address and an error code in a nonvolatile memory when a recording error occurs and, after recording is stopped, writing the error address and the error code read from the nonvolatile memory to a predetermined area of the optical disc; and a reproduction control portion for reading, when reproducing the data from the optical disc which is recorded according to the control of the recording control portion, the error address and the error code from the predetermined area and then storing the read error address and error code in the nonvolatile memory and, if an address of a recording error is found after reading of the data of the optical disc has started, reading the error address and the error code from the nonvolatile memory and then transferring the read error address and error code to a back-end processing portion to prevent data from being read from the address of the recording error.

With this configuration, since an address at which a recording error has occurred can be previously located, there is no need to perform a retry a number of times on an address from which data cannot be read at the time of reproduction. This eliminates time loss in recording/reproducing, helps achieve a shorter response time, and, by recording on an optical disc an address at which an error has occurred at the time of recording, helps improve debugging efficiency.

BRIEF DESCRIPTION OF THE DRAWINGS

FIG. 2 is a schematic diagram of a recording area of a minus format DVD for explaining a process performed when an error occurs during the recording in this embodiment;

FIG. 3 is a schematic diagram of a recording area of a plus format DVD for explaining a process performed when an error occurs during the recording in this embodiment;

FIG. 4 is a schematic diagram of a recording area of a minus format DVD for explaining an operation carried out at the time of re-mounting in this embodiment;

FIG. 5 is a schematic diagram of a recording area of a plus format DVD for explaining an operation carried out at the time of re-mounting in this embodiment;

DETAILED DESCRIPTION OF PREFERRED EMBODIMENTS

Figure 1:
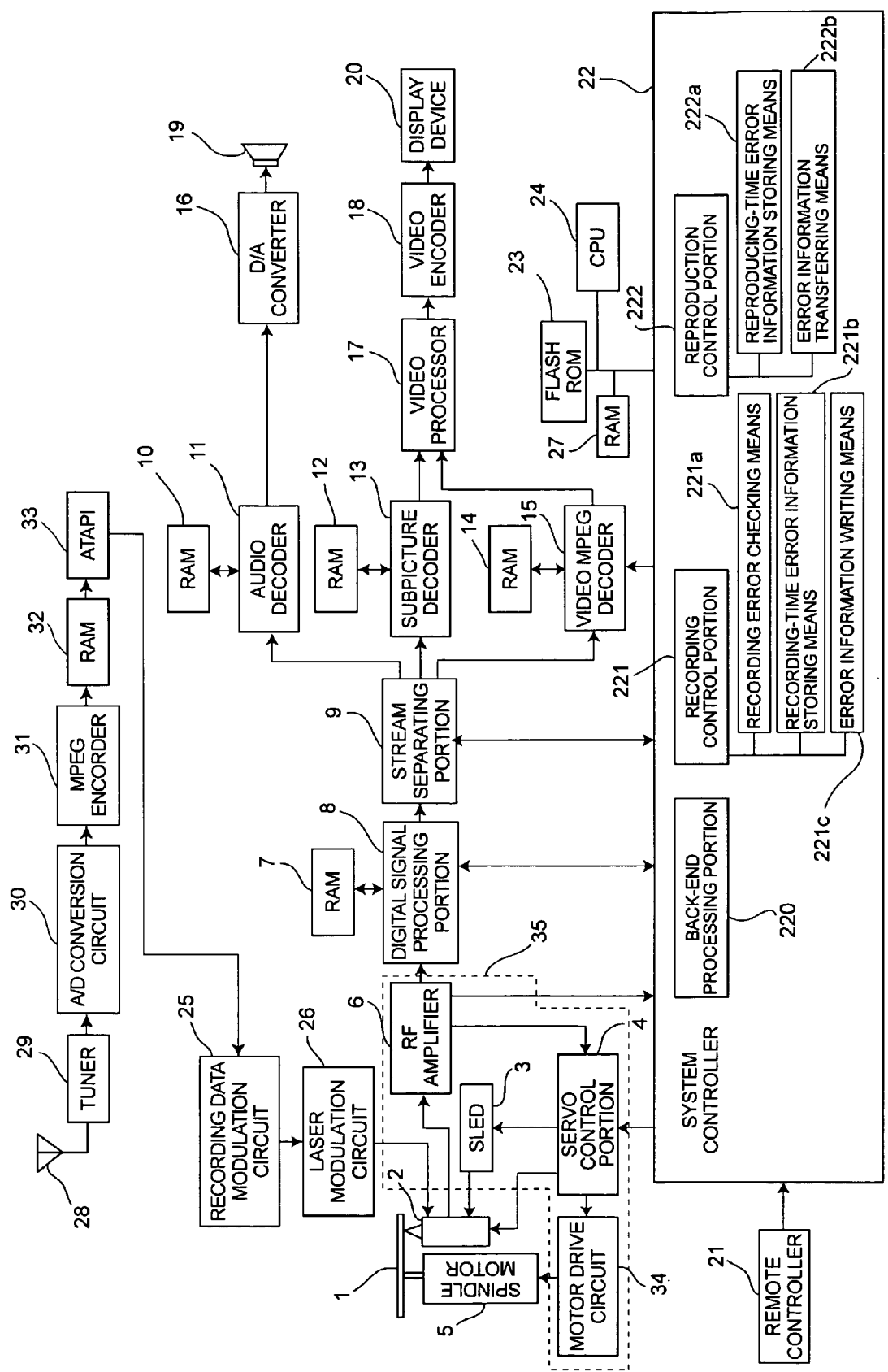
FIG. 1 is a block diagram showing the structure of an optical disc recording/reproducing apparatus according to one embodiment of the present invention.

Hereinafter, an embodiment of the present invention will be described with reference to the accompanying drawings. FIG. 1 is a block diagram showing the structure of an optical disc recording/reproducing apparatus according to one embodiment of the present invention.

This optical disc recording/reproducing apparatus has a system controller 22 that controls the entire apparatus, a spindle motor 5 that rotates an optical disc 1, an optical pickup 2 that optically writes and reads information to and from the optical disc 1, and a sled 3 that moves the optical pickup 2 in a radial direction of the optical disc 1. The optical disc recording/reproducing apparatus also has a servo control portion 4 that drives the spindle motor 5 and the sled 3 according to instructions from the system controller 22, and moves a focus position of laser light in vertical and horizontal directions relative to a recording plane of the optical disc 1 by moving an objective lens (not shown) built in the optical pickup 2. The sled 3, the servo control portion 4, a motor drive circuit 34, and an RF amplifier 6 which will be described later together form a front-end processing portion 35.

The optical disc recording/reproducing apparatus also has an RF amplifier 6 that amplifies an RF signal, the read signal from the optical pickup 2, at the time of reproducing data from the optical disc 1, a digital signal processing portion 8 that converts the RF signal outputted from the RF amplifier 6 into digital data, then performs signal demodulation and error correction according to the data format of the optical disc 1, and then stores the resultant data in a RAM 7 serving as a buffer memory, and a stream separating portion 9 that separates audio data, subpicture data, and video data from the data stream outputted from the digital signal processing portion 8 according to instructions from the system controller 22.

Furthermore, the optical disc recording/reproducing apparatus has an audio decoder 11 that receives audio data outputted from the stream separating portion 9 and then performs predetermined decoding, a RAM 10 that temporarily stores data for performing decoding in the audio decoder 11, a subpicture decoder 13 that receives subpicture data outputted from the stream separating portion 9 and then performs predetermined decoding, a RAM 12 that temporarily stores data for performing decoding in the subpicture decoder 13, a video MPEG decoder 15 that receives video data outputted from the stream separating portion 9 and then performs decoding according to the MPEG standard, and a RAM 14 that temporarily stores data for performing decoding in the video MPEG decoder 15.

The optical disc recording/reproducing apparatus also has a video processor 17 that combines data outputted from the video MPEG decoder 15 with data outputted from the subpicture decoder 13 according to instructions from the system controller 22, a video encoder 18 that converts the combined data outputted from the video processor 17 into a video signal for display, and then makes a display device 20 display a corresponding image thereon, and a D/A converter 16 that converts data outputted from the audio decoder 11 into an analog audio signal, and then feeds the audio signal to, for example, a loudspeaker 19.

The optical disc recording/reproducing apparatus also has a remote control 21 provided with various operation keys including a record key for giving a record instruction to the system controller 22, a playback key for giving a playback instruction thereto, and a stop key for giving a record/playback stop instruction thereto, and an apparatus main operation portion (not shown) provided with fewer operation keys than those of the remote control 21. Furthermore, the optical disc recording/reproducing apparatus has a flash ROM 23, which is a nonvolatile memory, that stores a program or data for controlling individual components of the apparatus or the entire apparatus, a CPU 24 that performs arithmetic operations according to the program or data stored in the flash ROM 23 and controls the system controller 22, and a RAM 27 that temporarily stores data required for arithmetic operations performed by the CPU 24.

The optical disc recording/reproducing apparatus also has a tuner 29 connected to an antenna 28, an A/D conversion circuit 30 that converts an analog video/audio signal of a television broadcast selected by the tuner 29 or a video/audio signal outputted from an unillustrated television receiver or another video/audio output apparatus into digital video/audio data, an MPEG encoder 31 that encodes the video/audio data according to the MPEG (Moving Picture Experts Group) standard, a RAM 32 that serves as a buffer memory that temporarily stores a predetermined amount of encoded video/audio data (hereinafter "encoded data"), an ATAPI (AT Attachment Packet Interface) 33 that serves as an interface between the RAM 32 and a recording data modulation circuit 25, a recording data modulation circuit 25 that modulates the encoded data transmitted from the ATAPI 33 for recording it on the optical disc 1, and a laser modulation circuit 26 that outputs to the optical pickup 2 a laser modulation signal for modulating laser light based on the modulated data from the recording data modulation circuit 25.

The optical disc recording/reproducing apparatus has the system controller 22 including a recording control portion 221, and operates, when recording data on an optical disc such as a minus format DVD or a plus format DVD, in the following manner with the following components, which are features of this embodiment: the recording error checking means 221a for checking whether or not a recording error has occurred during the recording of data; recording-time error information storing means 221b for storing an error address and an error code in the flash ROM 23 if the recording error is found to have occurred; and error information writing means 221c for writing, after recording is stopped, the error address and the error code read from the flash ROM 23 to the recording management area of a disc for a minus format DVD and to the initial zone of a disc for a plus format DVD, all of which are included in the recording control portion 221.

The system controller 22 also includes a reproduction control portion 222 including: reproducing-time error information storing means 222a for reading, when reproducing data of a minus format DVD on which the data is recorded according to the control of the recording control portion 221, the error address and the error code from the recording management area of the disc and storing them in the flash ROM 23, and reading, when reproducing data of a plus format DVD on which the data is recorded according to the control of the recording control portion 221, the error address and the error code from the initial zone of the disc and storing them in the flash ROM 23; and error information transferring means 222b for reading, if an address of a recording error is found after reading of DVD data has started, the error address and the error code from the flash ROM 23 and then transferring them to a back-end processing portion 220. The back-end processing portion 220 performs back-end processing such as compression/decompression of video/audio data, output of still/moving images, or arithmetic operations.

FIG. 2 is a schematic diagram of a recording area of a minus format DVD for explaining a process performed when an error occurs during the recording in this embodiment. As shown in FIG. 2, the recording area of a minus format DVD consists of a lead-in area, a data zone, a lead-out area, and an RMA (recording management area) located in front of the lead-in area.

FIG. 3 is a schematic diagram of a recording area of a plus format DVD for explaining a process performed when an error occurs during the recording in this embodiment. As shown in FIG. 3, a recording area of a plus format DVD consists of an initial zone, a lead-in zone, a data zone, and a lead-out zone. In front of the lead-in zone, a DCB (disc control block) corresponding to a recording management area is provided.

FIG. 4 is a schematic diagram of a recording area of a minus format DVD for explaining an operation carried out at the time of re-mounting in this embodiment. As shown in FIG. 4 (as already shown in FIG. 2), a recording area of a minus format DVD includes a lead-in area and an RMA (recording management area) located in front of the lead-in area.

FIG. 5 is a schematic diagram of a recording area of a plus format DVD for explaining an operation carried out at the time of re-mounting in this embodiment. As shown in FIG. 5 (as already shown in FIG. 3), a recording area of a plus format DVD consists of an initial zone, a lead-in zone, a data zone, and a lead-out zone, and, in front of the lead-in zone, a DCB corresponding to a recording management area is provided.

Figure 6:
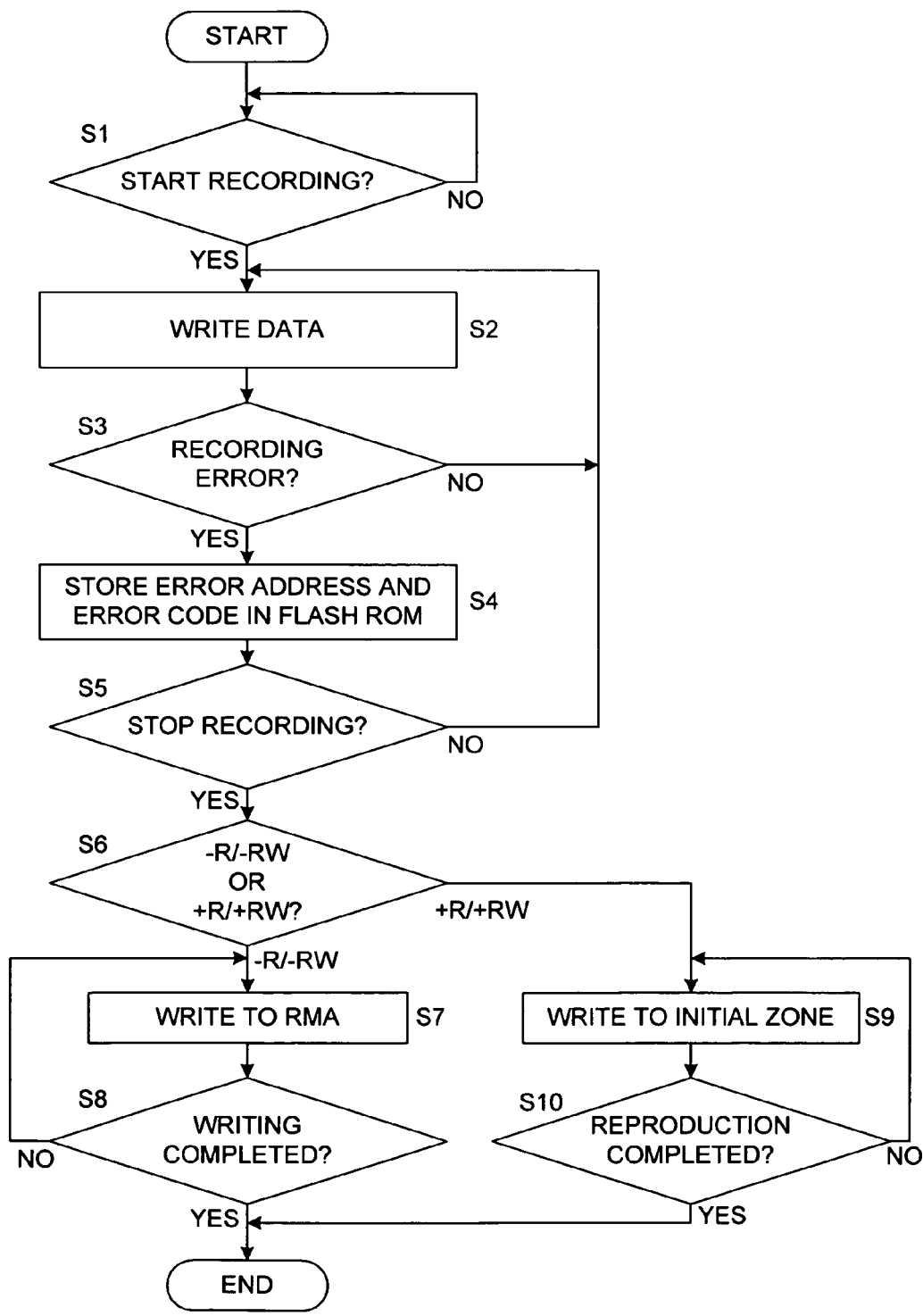
FIG. 6 is a flowchart for explaining a process performed at the time of recording on a minus format DVD or a plus format DVD in this embodiment.

FIG. 6 is a flowchart for explaining a process performed at the time of recording on a minus format DVD or a plus format DVD in this embodiment. With reference to this flowchart and FIGS. 1 to 3, a process performed at the time of recording on a minus format DVD or a plus format DVD will be described. This process is performed by the recording control portion 221 of the system controller 22.

First, a minus format DVD is loaded into the optical disc recording/reproducing apparatus in preparation for recording. When the record key (Rec key) of the remote control 21 is pressed, recording of data of a TV program received by the antenna 28 and selected by the tuner 29 is started (step S1), and the data is written to this optical disc (step S2). If a recording error occurs during the recording (step S3), the recording error checking means 221a of the recording control portion 221 checks for the occurrence of a recording error based on laser power information that has been monitored during the recording and error detection results obtained during the recording, such as a focus error signal or a tracking error signal.

If a recording error is found to have occurred, the recording-time error information storing means 221b of the recording control portion 221 stores an error address and an error code (a code indicating the contents of the error) in the flash ROM 23 (step S4). The procedure from step S2 to step S4 is repeatedly performed until the recording is stopped. When the recording is stopped (step S5), disk information is checked for determining whether the optical disc is a DVD-R or a DVD-RW (step S6). If the optical disk is found to be a DVD-R or a DVD-RW, the error information writing means 221c of the recording control portion 221 writes the error address and the error code stored in the flash ROM 23 to the RMA of the minus format DVD (step S7). These error information is recorded in the RMA along with the RMD (recording management data). Upon completion of writing to the RMA (step S8), recording on the minus format DVD is completed.

On the other hand, if the loaded optical disc is found to be a plus format DVD based on the disk information (step S6), the error information writing means 221c of the recording control portion 221 reads the error address and the error code stored in the flash ROM 23, and writes them to the initial zone of the plus format DVD (step S9). Upon completion of writing these error information to the initial zone (step S10), recording on the plus format DVD is completed. Instead of writing to the initial zone, these error information may be written to the DCB. For a plus format DVD, however, data of the DCB is not always updated when the recording is stopped. Thus, it is preferable that the error information be written to the initial zone.

Figure 7:
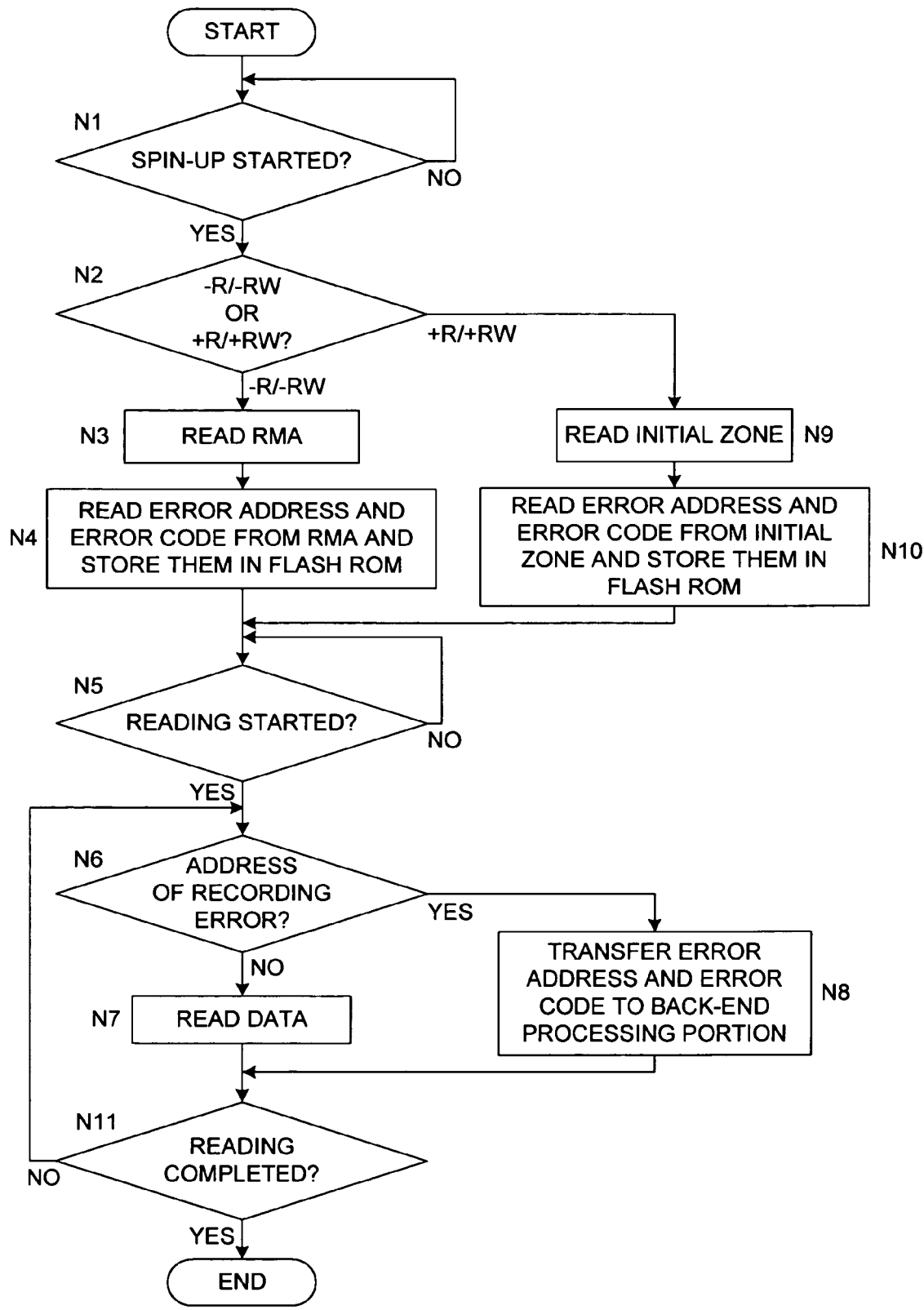
FIG. 7 is a flowchart for explaining a process performed at the time of reproducing (especially re-mounting) data from a minus format DVD or a plus format DVD in this embodiment.

FIG. 7 is a flowchart for explaining a process performed at the time of reproducing (especially re-mounting) data from a minus format DVD or a plus format DVD in this embodiment. With reference to this flowchart and FIGS. 1, 4, and 5, a process performed at the time of reproducing (especially re-mounting) data from a minus format DVD or a plus format DVD will be described. This process is performed by the reproduction control portion 222 of the system controller 22.

Assume that a disc tray of the optical disc recording/reproducing apparatus is opened to remove therefrom a minus format DVD or a plus format DVD for which the recording process has been performed, and then the disc tray is closed with the optical disc re-mounted thereon. Then, the following re-mounting process is performed.

When a minus format DVD or a plus format DVD is loaded into the optical disc recording/reproducing apparatus, the optical disc begins to rotate and spins up to set the optical pickup 2 to a predetermined initial position (step N1). If the optical disc is found to be a minus format DVD based on the disk information (step N2), the reproducing-time error information storing means 222a of the reproduction control portion 222 reads the RMA of the optical disc (step N3) to obtain the error address and the error code from the RMA, and then stores them in the flash ROM 23 (step N4).

On the other hand, if the optical disc is found to be a plus format DVD based on the disk information (step N9), the reproducing-time error information storing means 222a of the reproduction control portion 222 reads the initial zone of the optical disc (step N9) to obtain the error address and the error code from the initial zone, and then stores them in the flash ROM 23 (step N10).

After step N4 or N10, the play back key of the remote control 21 is pressed to start reading (step N5). If an address of a recording error is not found (step N6), reading of data is performed (step N7). If an address of a recording error is found (step N6), the error information transferring means 222b of the reproduction control portion 222 transfers the error address and the error code to the back-end processing portion 220 (step N8) to prevent data from being read from the address of the recording error. The operation of steps N6, and N7 or N8 is continuously performed until the procedure is stopped at the completion of reproduction of data or the apparatus is stopped (step N11).

That is, the error information transferring means 222b reads from the optical disc an error address and an error code that have been recorded thereon in the manner as described above, and then generates a vendor unique command for the acquisition of information, when requested to do so by the back-end processing portion 220, to make it possible to transfer the read error address and error code to the back-end processing portion 220. By doing so, the back-end processing portion 220 can find out the address that is prohibited from reading, and is saved from making a needless reading request on the address. In addition, since the front-end processing portion 35 also records the contents of an error, it is apparent what type of error has caused a recording error. This helps improve debugging efficiency.

As described above, according to this embodiment, since an address at which a recording error has occurred can be previously located, there is no need to perform a retry a number of times on an address from which data cannot be read. This eliminates time loss in recording/reproducing, helps achieve a shorter response time, and, by recording on an optical disc an address at which an error has occurred at the time of recording, helps improve debugging efficiency.

What is claimed is:

1. An optical disc recording/reproducing apparatus that records and reproduces data on and from an optical disc, the optical disc recording/reproducing apparatus comprising:
   a recording control portion for storing, when a recording error occurs during recording of data on the optical disc, an error address and an error code indicating contents of the recording error in a nonvolatile memory and, after recording is stopped, writing the error address and the error code read from the nonvolatile memory to a predetermined area of the optical disc; and
   a reproduction control portion for reading, when reproducing the data from the optical disc which is recorded according to control of the recording control portion, the error address and the error code from the predetermined area and then storing the read error address and error code in the nonvolatile memory and, if an address of a recording error is found after reading of the data of the optical disc has started, reading the error address and the error code from the nonvolatile memory and then transferring the read error address and error code to a back-end processing portion to prevent data from being read from the address of the recording error.

2. The optical disc recording/reproducing apparatus of claim 1, wherein the optical disc is one of a DVD-R, a DVD-RW, a DVD+R, and a DVD+RW.

3. The optical disc recording/reproducing apparatus of claim 2,
   wherein, when the optical disc is a DVD-R or a DVD-RW, the predetermined area is an RMA (recording management area) of the optical disc, and
   wherein, when the optical disc is a DVD+R or a DVD+RW, the predetermined area is an initial zone of the optical disc.

4. An optical disc recording/reproducing apparatus that records and reproduces data on and from an optical disc, the optical disc recording/reproducing apparatus comprising:
   a recording control portion including
      recording error checking means for checking, when recording data on the optical disc, whether or not a recording error has occurred during recording of data,
      recording-time error information storing means for storing, if the recording error is found to have occurred, an error address and an error code indicating contents of the recording error in a nonvolatile memory, and
      error information writing means for writing, after recording is stopped, the error address and the error code read from the nonvolatile memory to a predetermined area of the optical disc; and
   a reproduction control portion including
      reproducing-time error information storing means for reading, when reproducing data of the optical disc on which the data is recorded according to control of the recording control portion, the error address and the error code from the predetermined area and then storing the read error address and error code in the nonvolatile memory, and
      error information transferring means for reading, if an address of the recording error is found after reading of the data of the optical disc has started, the error address and the error code from the nonvolatile memory and then transferring the read error address and error code to a back-end processing portion to prevent data from being read from the address of the recording error.

5. The optical disc recording/reproducing apparatus of claim 4, wherein the optical disc is one of a DVD-R, a DVD-RW, a DVD+R, and a DVD+RW.

6. The optical disc recording/reproducing apparatus of claim 5,
   wherein, when the optical disc is a DVD-R or a DVD-RW, the predetermined area is an RMA (recording management area) of the optical disc, and
   wherein, when the optical disc is a DVD+R or a DVD+RW, the predetermined area is an initial zone of the optical disc.

7. The optical disc recording/reproducing apparatus of claim 4, wherein the data is recorded in a recording area of consecutive addresses on the optical disc.

* * * * *